June 15, 1948.  C. E. BARNER  2,443,371
SHIELDED ELECTRIFIED CONVEYER
Filed Dec. 23, 1944
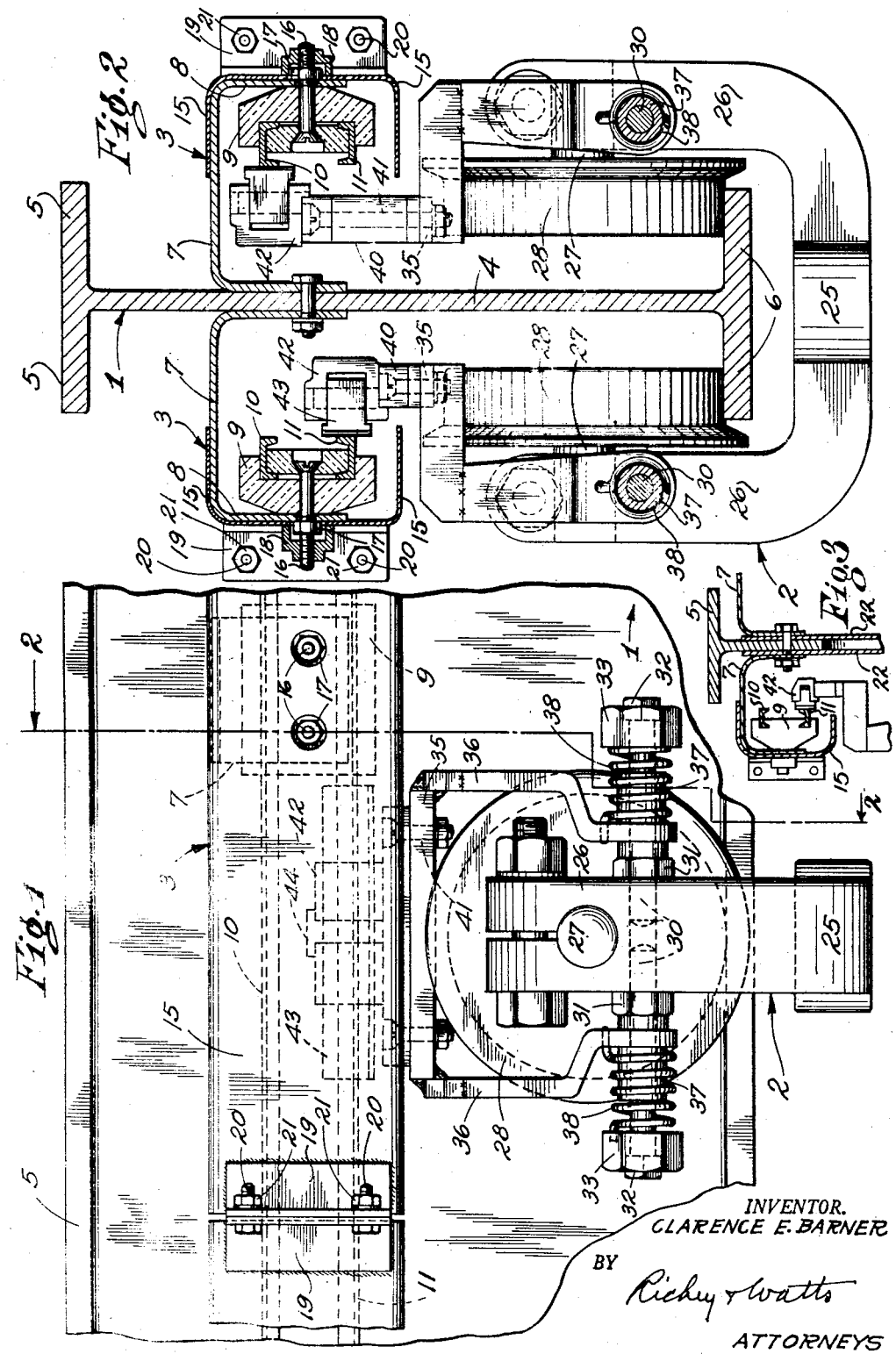
INVENTOR.
CLARENCE E. BARNER
BY
Richey & Watts
ATTORNEYS Patented June 15, 1948

2,443,371

UNITED STATES PATENT OFFICE 2,443,371

SHIELDED ELECTRIFIED CONVEYER

Clarence E. Barner, Lakewood, Ohio, assignor to The American MonoRail Company, Cleveland, Ohio, a corporation of Ohio Application December 23, 1944, Serial No. 569,440

6 Claims. (Cl. 191—23)

1

The present invention relates generally to overhead conveyors and particularly to such conveyors which are electrified and shielded.

Efforts have been made heretofore to shield the current carrying bus bars of electrified overhead monorail conveyor systems, but with one exception, those efforts have not been entirely satisfactory so far as I am advised.

Apparatus embodying the present invention possesses all the advantages of the apparatus disclosed in that application and other advantages not possessed by that apparatus. The present invention makes possible the use of simple, inexpensive collectors and the utilization of the space along the rail heretofore required by bus bars and collectors for other parts including larger diameter trolley wheels latching mechanism, trolley locking devices. This invention provides for ready assembly and disassembly of the shielding means without disturbance of the bus bars and adequate shielding of the bus bars.

The present invention will be better understood by those skilled in the art from the following description and the drawings forming a part of this specification, in which Fig. 1 is a fragmentary, side elevational view of monorail conveyor embodying the present invention;

Fig. 2 is a cross-sectional view taken on line 2—2 of Fig. 1; and,

Fig. 3 is a fragmentary showing of a modified form of the present invention.

The apparatus shown in these figures comprises a rail 1 carrying bus bars, a current collecting trolley designated as an entirety by numeral 2, and shields 3 for the bus bars.

The rail 1, as shown, is channel-shaped in section and comprises a web 4, top flanges 5 to be attached to an overhead beam or other suitable support, and flanges 6 at the lower edge of the web to serve as tracks for the trolley wheels. Brackets 7, secured to the web 4 of the rail, extend outwardly, and then downwardly as at 8. Insulators 9 are secured at the inner side of portions 8 of brackets 7 and support upper and lower bus bars 10 and 11. The inner edges of bus bars 10 and 11 are spaced some distance outwardly from the sides of web 2 for a purpose presently to appear.

Shields 15, preferably composed of thin sheet metal, are supported by brackets 7 and each such shield extends along the top of bracket 7 over bus bars 10 and 11, then downwardly along the outer surface of portions 8 of the brackets and then inwardly toward web 4 of the rail below the lowermost bus bar 11 and, preferably, to beyond the vertical plane of the inner edges of the bus bars. The upper parts of the shields 15 may be extended laterally along brackets 7 into contact with the rail web if desired. The bus bars and insulators 9 are connected to the brackets 7 as by bolts 16 and nuts 17 and enlarged nuts 18 which are recessed to receive nuts 17 are threaded onto bolts 16 to retain shields 15 in place on brackets 7. By means of this arrangement of parts any shield can be removed without disturbing the bus bars and insulators by simply removing nuts 18. The adjacent ends of shields 15 may be connected together by angles 19 on each shield and bolts 20 passing therethru equipped with nuts 21.

When rail 1 does not have a solid web as when the upper and lower flanges 5 and 6 are connected by strips or bars and a rod could be pushed thru the intervening openings, guards 22 may be secured by the bracket bolts and extend down far enough to prevent a rod from being passed thru the web into contact with bus bars on the opposite side of the web.

The trolley shown comprises a yoke, wheels and current collectors. The yoke 25 extends transversely beneath rail 1 and has arms 26 extending upwardly past flanges 6. Near their upper ends these arms carry wheel axles 27 on which are rotatably mounted wheels 28 to run on flanges 6. It will be noted that there is considerable space between the web 4 and the adjacent sides of wheels 28 which may be utilized for plates and bolts to splice together the adjacent ends of lengths of rail 1 without interference of the wheels with such splicing means.

Each arm 26 of yoke 25 is provided with pivot means to which a current collector is secured. As shown, this pivot means includes rods 30 extending fore and aft from arms 26 and parallel to the web 4. These rods 30 may be screw-threaded into arms 26 and locked in place against turning by nuts 31. Each rod is provided at its outer end with a squared head 32 and nuts 33 positioned on rods 30 have square countersunk recesses in their outer ends to receive squared heads 32 of rods 30. Each current collector comprises a body 35 extending parallel to the web 4 and positioned above the tread of adjacent wheel 28, and legs 36 which extend from the ends of body 35 outwardly over and down along the side of the adjacent wheel 28. At their lower ends these legs 36 carry sleeves 37 rotatably mounted on rods 30. Springs 38 surround sleeves 37 and project into recesses in the nuts 32 and legs 36. The winding of these springs is such that they exert pressure on legs 36 tending to pivot the legs outwardly away from the rail 1 and against the bus bars.

It will be understood that when the tension on any spring 38 is to be adjusted, the nut 31 on the rod 30 carrying such spring may be loosened and the rod 30 may be turned to increase or decrease the tension of the spring, the nut 33 turning simultaneously with rod 30. When the tension on the spring has been adjusted to the extent desired nut 31 may again be tightened to prevent turning of rod 30.

If desired rods 30 may be replaced by one rod which extends loosely thru the yoke arm and is threaded for nuts 31 which, when tightened against the arm, will prevent turning of the rod. In case such a rod is used it has a squared head at one end and is threaded at the other end and supplied with a square nut.

Each body 35 of the current collector is connected to a block 40, as by bolts 41, and each block 40 carries a shoe holder 42 and a current collecting shoe 43, the shoe and shoe holder being loosely connected to block 40, as by pin 44. The holders and shoes are located in the space between the rail web and the bus bars and the outer surface of shoe 43 bears against the inner surface of one of the bus bars 10 or 11, depending on the vertical length of the block 40 associated therewith.

It will be understood that current carrying wires (not shown) are electrically connected to shoes 43 and are carried down along blocks 40 and arms 36 and thence to a motor (not shown).

It will be noted that the outwardly extending portions of legs 36 of the current collectors are substantially perpendicular to the rail web 4 and are spaced some distance below the lowermost bus bars 11. The space between these parts accommodates the inwardly extending lower parts of shields 5 and makes possible satisfactory shielding of the bus bars while affording ample space for pivot movement of the current collectors without engaging the latter therewith.

It will be seen from the foregoing description and the drawings that the present invention provides adequate clearance between the trolley wheels and rail splices, and provides such shielding of the bus bars as to make it practically impossible for the parts of a workman's body or tools in his hands to come into accidental engagement with the bus bars, that the shielding may be readily removed or assembled with the remainder of the apparatus without disturbance of the bus bars, and that a wide range of movement of the current collectors is permitted without engagement of the collectors with the shielding, the wheels, rail splices or the means for securing brackets 7 to the rail. Furthermore, since the current collectors are disposed within the outer vertical margins of the yoke, no extra width dimensions are required, and since the current collectors are supported centrally or symmetrically with respect to the yoke arms there will be no lateral twisting forces exerted on the pivot rods or yokes and substantially no variation in pressure of the collector shoes 43 on the bus bars even when the trolley is traveling along either inside or outside curves.

Having thus described my invention so that others skilled in the art may be able to understand and practice the same, I state that what I desire to secure by Letters Patent is defined in what is claimed.

What is claimed is:

1. An overhead conveyor comprising a rail having a web and outwardly extending flanges near its lower edge, brackets extending outwardly from opposite sides of said web well above said flanges, current conducting bus bars carried by said brackets and separated from the web by open spaces, and a trolley having wheels to run on said flanges and current collectors extending into said spaces to engage the bus bars, each of said current collectors comprising a body extending longitudinally of the web vertically above the adjacent wheel, legs supporting said body and extending from the ends of said body outwardly over and downwardly at the side of said wheel, means pivotally connecting said legs to said trolley, a block extending upwardly from said body, a shoe holder on said block, a current collecting shoe in said holder, and means loosely connecting said shoe and holder to said block, said shoe and holder being disposed in the space between the web and the adjacent bus bars with the shoe slidably engaging one of said bars on a surface thereof opposed to said web.

2. An overhead conveyor comprising a rail having a web and outwardly extending flanges near its lower edge, brackets extending outwardly from opposite sides of said web well above said flanges, current conducting bus bars carried by said brackets and separated from the web by open spaces, a trolley having wheels to run on said flanges and pivoted current collectors extending into said spaces to engage the bus bars, and means for shielding said bus bars, each of said current collectors comprising a body extending longitudinally of the web vertically above the adjacent wheel, legs supporting said body and extending from the ends of said body outwardly over and downwardly at the outer side of said wheel, means pivotally connecting said legs to said trolley, and a current collecting shoe connected to said body and disposed in the space between the web and the adjacent bus bars and slidably engaging one of said bars on a surface thereof opposed to said web, said shielding means including a shield extending outwardly along said brackets over said bus bars, downwardly outside of said bars and inwardly beneath said bars, and above the outwardly extending legs of the adjacent collector.

3. An overhead conveyor comprising a rail having a web and outwardly extending flanges near its lower edge, brackets extending outwardly from opposite sides of said web well above said flanges, current conducting bus bars carried by said brackets and separated from the web by open spaces, a trolley having wheels to run on said flanges and current collectors extending into said space to engage the bus bars, and means for shielding said bus bars, each of said current collectors comprising a body extending longitudinally of the web above the adjacent wheel, legs supporting said body and extending from the ends of said body outwardly over and downwardly at the side of said wheel, means pivotally connecting said legs to said trolley, a block extending vertically upward from said body, a shoe holder on said block and a current collecting shoe in said holder, said shoe and holder being disposed in the space between the web and the adjacent bus bars and with the shoe slidably engaging one of said bars on a surface thereof opposed to said web, said shielding means each including a shield carried by said brackets and having a top portion on top of said brackets over said bus bars, a side portion outside of said bus bars and a bottom portion extending toward the rail web between the lower bus bar and the outwardly extending collector legs and terminating beyond the vertical projection of the shoe engaged surface of the bus bar short of the point of maximum outward movement of said block when the shoes engage the bus bars.

4. An overhead conveyor comprising a rail having a web and outwardly extending flanges near its lower edge, a bracket having a portion extending outwardly from one side of said web, a current conducting bus bar below said bracket and separated from the web by an open space, a trolley having wheels to run on said flanges and a current collector pivoted thereto, said collector comprising legs pivoted close to the fore and aft sides of said trolley near the outer side of one of said wheels, extending horizontally fore and aft and then upwardly and inwardly of said wheel, and carrying a bus bar engaging a shoe in said space above, and in the vertical plane of, said wheel to engage the inner side of the bus bar, an insulator engaging the outer side of said bus bar, and connecting means extending from said insulator through said bracket for attaching said bar to said bracket.

5. An overhead conveyor comprising a rail having a web and outwardly extending flanges near its lower edge, a bracket having a portion extending outwardly from one side of said web and a downwardly extending portion, a current conducting bus bar disposed along the inner side of said downwardly extending portion with the inner side of said bar being separated from the web by an open space, a trolley having wheels to run on said flanges and a current collector pivoted thereto and extending into said space to engage the inner side of the bus bar, an insulator on the outer side of said bus bar, means for shielding said bus bar comprising a shield extending outwardly over said outwardly extending portion of the bracket, downwardly beside the outer side of said downwardly extending portion of the bracket and then inward toward the web below the bracket and bar and out of contact with said collector, and means extending from said insulator through said downwardly extending portion of the bracket and through said shield for attaching said bar and shield to said bracket.

6. An overhead conveyor comprising a rail having a web and outwardly extending flanges near its lower edge, a bracket having a portion extending outwardly from one side of said web and a downwardly extending portion, a current conducting bus bar disposed along the inner side of said downwardly extending portion and connected thereto, a trolley having wheels to run on said flanges, a current collector including a shoe disposed between the web and bar to engage the inner side of the latter, said current collector comprising said shoe, a body carrying the shoe and extending substantially parallel to the web and above the adjacent wheel, legs supporting said body and extending outwardly over the wheel flange and then down on opposite sides of said trolley and means pivotally connecting the lower ends of said legs to the trolley.

CLARENCE E. BARNER.

REFERENCES CITED

The following references are of record in the file of this patent:

UNITED STATES PATENTS

| Number | Name | Date |
|---|---|---|
| 1,466,873 | Dunbar | Sept. 4, 1923 |
| 2,137,694 | McCain | Nov. 22, 1938 |
| 2,306,885 | Klein et al. | Dec. 29, 1942 |
| 2,331,860 | Stevens | Oct. 12, 1943 |